UNITED STATES PATENT OFFICE.

THOMAS RITCHIE GREENHORNE, OF GLASGOW, SCOTLAND.

PROCESS FOR REMOVING SCALE FROM INCRUSTED SURFACES.

1,135,684.      Specification of Letters Patent.      Patented Apr. 13, 1915.

No Drawing.      Application filed September 26, 1913. Serial No. 791,959.

*To all whom it may concern:*

Be it known that I, THOMAS RITCHIE GREENHORNE, a subject of the King of the United Kingdom of Great Britain and Ireland, and residing at Glasgow, Scotland, have invented a certain new and useful Improvement in Processes for Removing Scale From Incrusted Surfaces, of which the following is a specification.

This invention relates to an improved process of removing scale consisting of or containing carbonate, i. e., carbonate of lime and/or magnesia, from the internal surfaces of steam boilers.

In accordance with the invention there is passed directly into the boiler, when filled with cold water, a charge of carbonic acid gas which enters into solution in the water, the water charged with such gas being allowed to remain in the boiler a sufficient time—say 48 hours or thereabout—to effect loosening of scale from the metal surface caused by the solvent and disintegrating action of the $CO_2$ solution on the carbonates of lime and magnesia.

The carbonic acid gas may be derived from any suitable source, e. g., from a cylinder containing gas under pressure, a connection being taken from the cylinder to the bottom of the boiler. The boiler is closed at the time the gas is admitted so that a supersaturated solution is formed.

I claim:

The hereindescribed process of removing scale from the incrusted internal surface of a boiler, consisting in filling the boiler with cold water, passing directly into the cold water in the boiler a charge of carbonic acid gas under pressure to form a supersaturated solution of carbonic acid gas in water, and allowing the supersaturated solution of carbonic acid gas in water to act on the incrusted surface.

In testimony whereof I have signed my name to this specification in the presence of two subscribing witnesses.

THOMAS RITCHIE GREENHORNE.

Witnesses:
    WALLACE CRANSTON,
    DOUGLAS KEITH.